March 1, 1960 W. M. ASHLEY, JR 2,926,969
VERTICAL ADJUSTING MEANS FOR WHEELS OF CRAWLER VEHICLES
Filed Sept. 20, 1957 4 Sheets-Sheet 1

Inventor:
Walter M. Ashley, Jr.
Paul O. Pippel Atty.

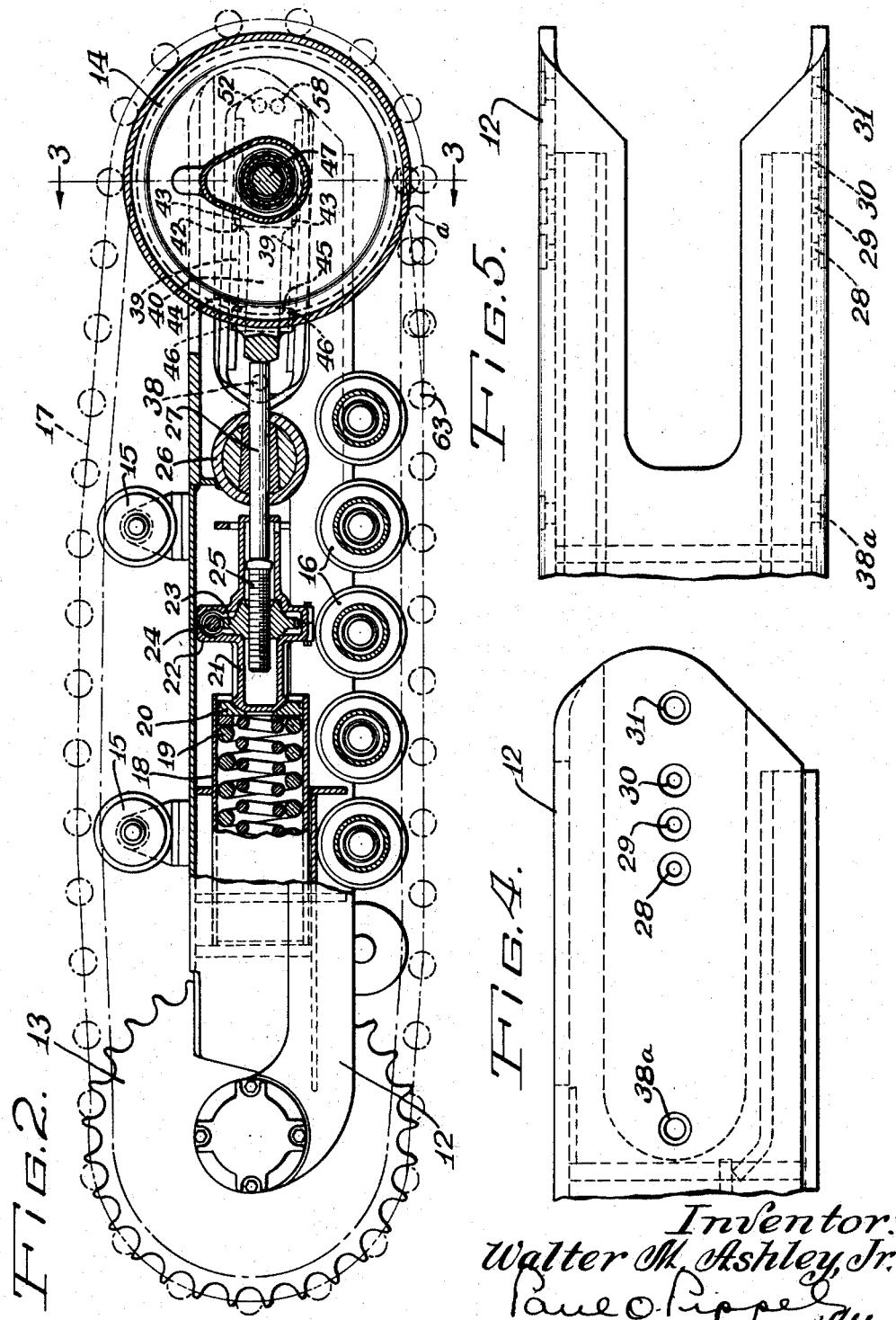

March 1, 1960 W. M. ASHLEY, JR 2,926,969
VERTICAL ADJUSTING MEANS FOR WHEELS OF CRAWLER VEHICLES
Filed Sept. 20, 1957 4 Sheets-Sheet 3
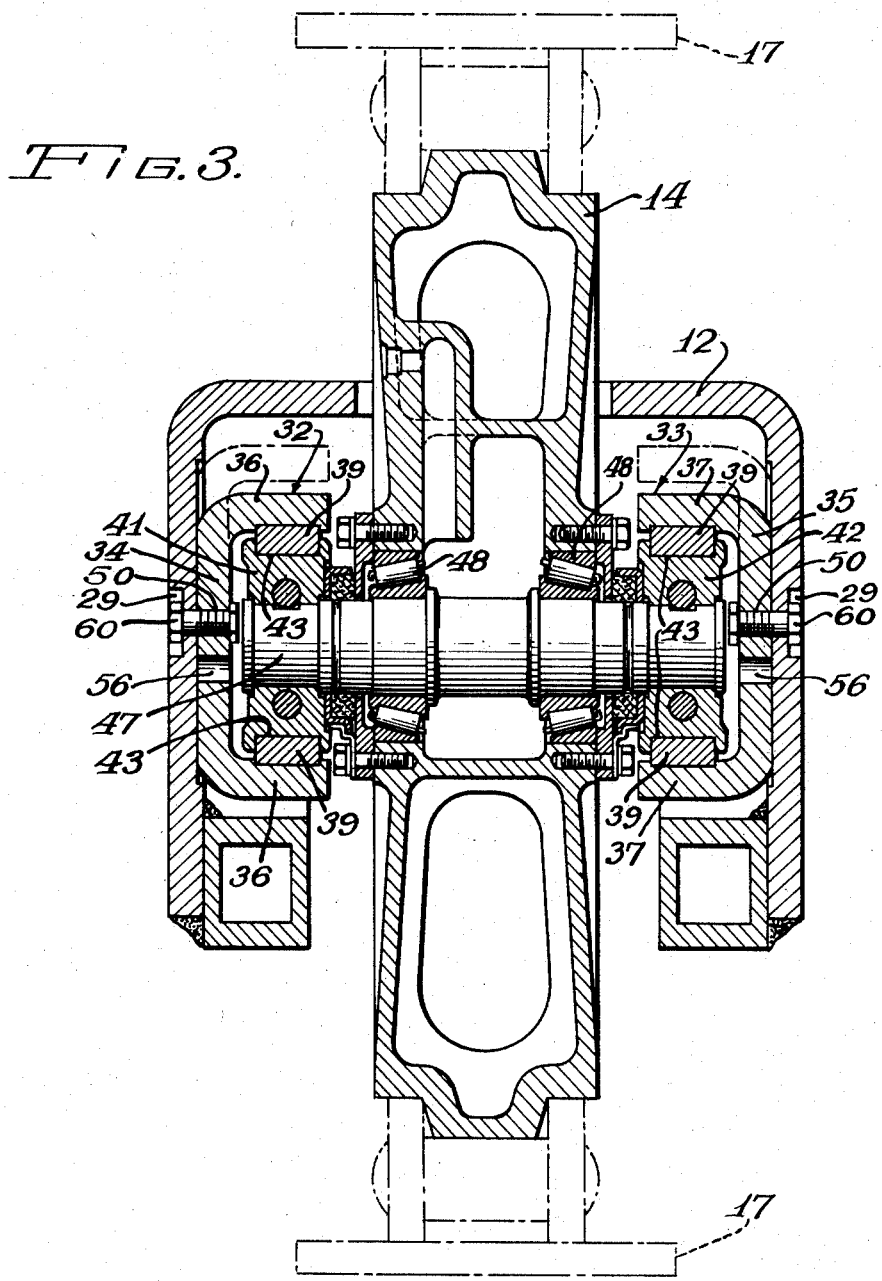
F1G.3.
Inventor:
Walter M. Ashley, Jr.
Paul O. Pippel Atty.

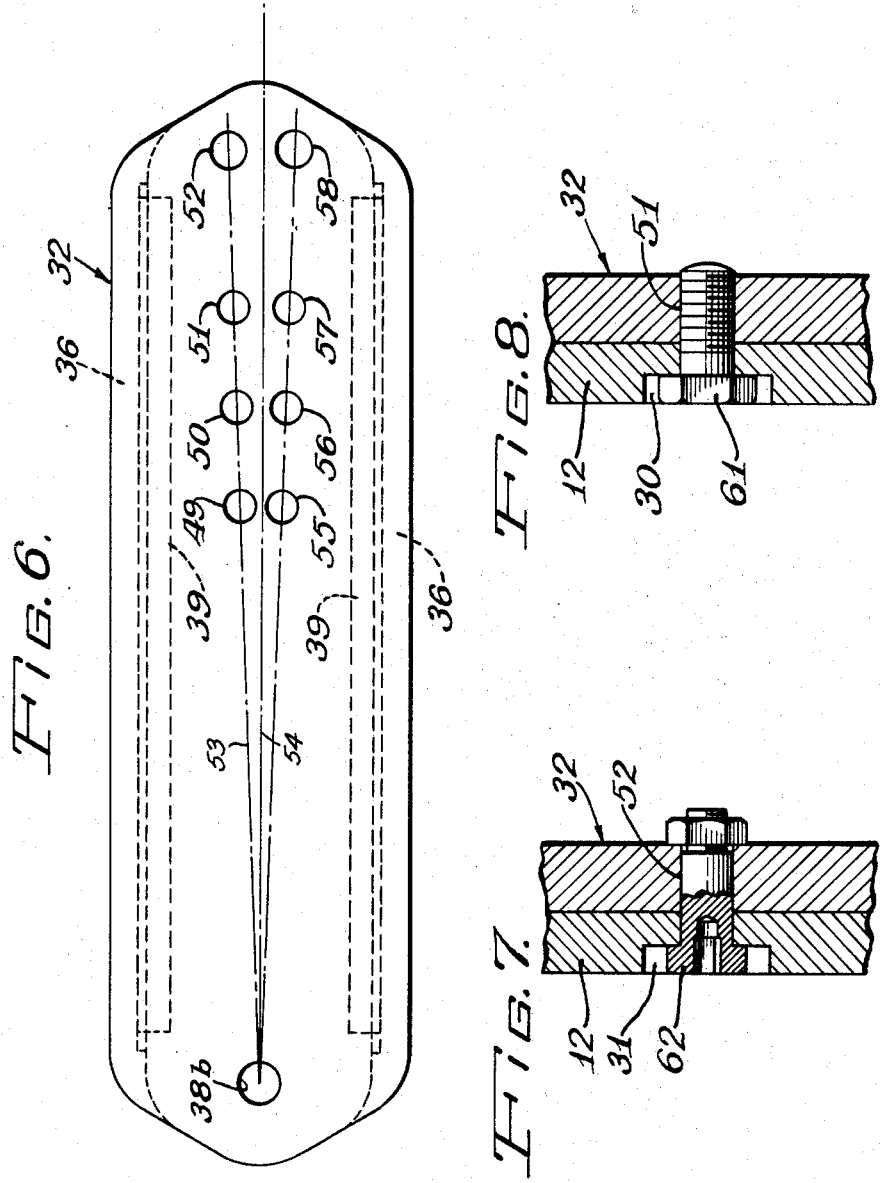

United States Patent Office 2,926,969
Patented Mar. 1, 1960

2,926,969

VERTICAL ADJUSTING MEANS FOR WHEELS OF CRAWLER VEHICLES

Walter M. Ashley, Jr., Glen Ellyn, Ill., assignor to International Harvester Company, Chicago, Ill., a corporation of New Jersey Application September 20, 1957, Serial No. 685,189

4 Claims. (Cl. 305—9)

This invention relates to crawler vehicles and is primarily concerned with a means of vertically adjusting a track carrying wheel of a crawler vehicle.

An object of the invention is to provide a means of vertically adjusting a track carrying wheel of a crawler vehicle which is easier and faster to adjust than the vertically adjusting means used in the past.

The foregoing and other objects of the invention will be apparent from the construction and arrangement illustrated in the accompanying drawings wherein:

Figure 2 is a partly side elevational and partly a longitudinal vertical sectional view of one crawler mechanism of the crawler tractor;

Figure 3 is a cross sectional view taken on the line 3—3 of Figure 2;

Figure 4 is a detail side elevational view of the front portion of one of the track frames of the crawler tractor;

Figure 5 is a top plan view of that portion of the track frame shown in Figure 4;

Figure 6 is a detail side elevational view of one of the members that carry the front idler wheel;

Figure 7 is a sectional view taken on the line 7—7 of Figure 1; and

Figure 8 is a sectional view taken on the line 8—8 of Figure 1.

Figure 1:
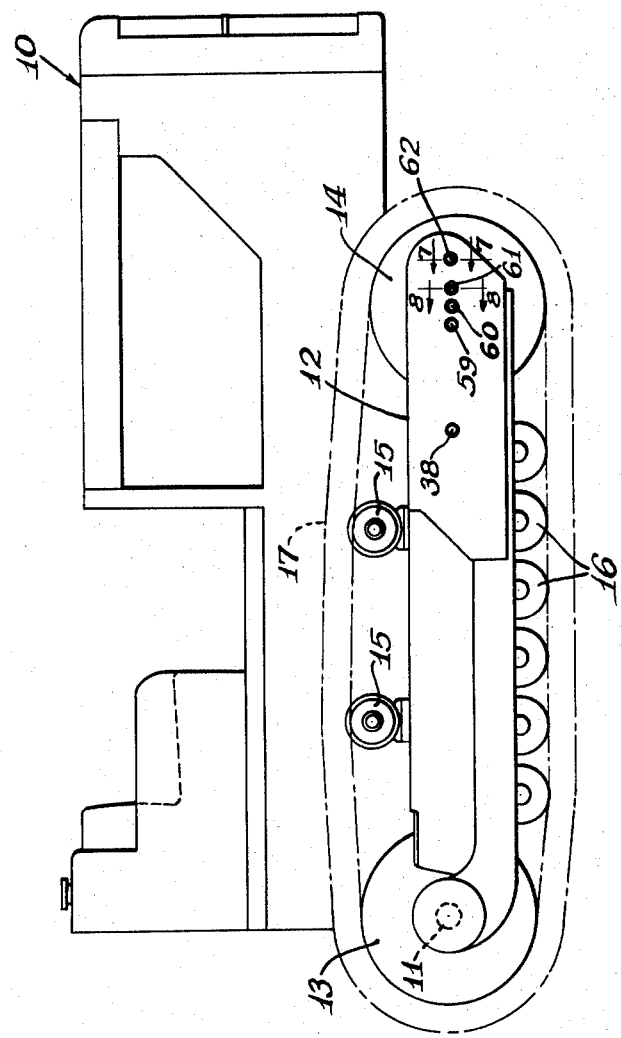
Figure 1 is a side elevational view of a crawler tractor.

In the past it has been the practice to furnish new crawler tractors with small diameter front idler wheels and large diameter front idler wheels. When the small diameter front idler wheels are mounted on the tractor the portion of the track from a point in rear of the front idler wheel to the front idler wheel is disposed at an angle above the ground. When the large diameter front idler wheels are mounted on the tractor, the portion of the track from said point to the front idler wheel lies flat on the ground. When the tractor is being operated on hard ground and the portion of the track from said point to the front idler wheel lies flat on the ground, the track grousers will pound against the front idler wheel as it engages the hard ground when the tractor is operating a bulldozer on the front end thereof or is pulling a scraper. This track grouser pounding against the front idler wheel will cause excessive wear on the front idler wheel and on the track. If there is an angle between the portion of the track from said point to the front idler wheel and the ground this track grouser pounding against the front idler wheel will be minimized. When the tractor carries a bucket on its front end and there is an angle between the portion of the track from said point to the front idler wheel and the ground, the load of earth in the bucket will cause the front end of the tractor to pivot downwardly about said point causing bouncing of the tractor operator rendering him uncomfortable. For this type of loading, the portion of the track from said point to the front idler wheel should lie flat on the ground. The portion of the track from said point to the front idler wheel should also lie flat on the ground for finished grading of a road surface for more efficient grading as will be more fully explained hereinafter. Thus it will be seen that both large and small diameter front idler wheels were necessary for the tractor to properly function with a large number of different types of earth working implements. One manufacturer has eliminated the need for both small and large diameter front idler wheel and has provided for vertical adjustment of the front idler wheel so that at one position of adjustment the portion of the track from said point to the front idler wheels makes an angle with the ground while at the other position of adjustment the portion of the track from said point to the front idler wheel lies flat on the ground. A pair of blocks were used and each block provided with a hole which was closer to the top than to the bottom of the block. The pair of blocks were bolted to the front idler wheel fork. The front idler wheel shaft was disposed in the holes in the pair of blocks and the front idler wheel mounted on the shaft. The front idler wheel was vertically adjusted by turning over the pair of blocks. To turn over the pair of blocks it was necessary to disassemble them and it was also necessary to take the track apart at one of the points between the track grousers.

The invention proposes a means of vertically adjusting the front idler wheel of a crawler tractor. The track frame of the tractor is made hollow and each side of the track frame is provided with a hole therein. A pair of members are disposed in the track frame and have one of their ends pivoted thereto and carry the front idler wheel. Each member is provided with a first hole making an angle upwardly from the longitudinal centerline thereof and a second hole making an angle downwardly from the longitudinal centerline thereof. Securing elements are provided for the holes in the members and track frame. To adjust the front idler wheel it is only necessary to remove the securing elements from their holes and pivot the members upwardly or downwardly until the desired holes in the members are opposite the holes in the track frame and then to replace the securing elements in the holes. This means of vertical adjustment of the front idler wheel is easier and faster to adjust than the inverted block means of said one manufacturer.

In the drawings, 10 generally designates a crawler vehicle having a frame which supports the engine, fuel tank, seat and other equipment. A track sprocket shaft 11 is mounted in the vehicle frame and the rear ends of a pair of track frames 12 disposed at opposite sides of the vehicle are mounted on the shaft. An equalizer bar not shown in the drawings extends transversely of the crawler vehicle under the vehicle frame and its ends are disposed in and rest on pads on the track frames 12 and it is connected to the vehicle frame centrally thereof by means of a pin joint. A track sprocket 13 is rotatably mounted on the track sprocket shaft 11 and is driven through gearing from the differential. The track sprocket 13 may be termed a wheel. A front idler wheel 14 is carried by each track frame 12 and upper rollers 15 and lower rollers 16 are also carried by each track frame. An endless track 17 is trained over the track sprocket 13, front idler wheel 14, upper rollers 15 and lower rollers 16. A cylinder 18 is fixed to each track frame 12 adjacent the track sprocket 13 and a track idler wheel recoil spring 19 is disposed in the respective cylinder. A piston 20 is disposed in the cylinder 18 and bears against the spring 19 and has a hollow structure 21 fixed thereto and projecting from the cylinder. The structure 21 has an enlarged portion 22 and a worm wheel 23 is rotatably mounted in the enlarged portion and a worm gear 24 is also rotatably mounted in the enlarged portion and meshes with the worm wheel. The worm wheel 23 has a threaded opening therethrough which receives a threaded bar 25. A structure 25 is fixed to the respective track frame 12 and a bar 27 is slidably disposed in the structure.

Each track frame 12 is hollow and each side of each track frame is provided with countersunk holes 28, 29, 30 and 31 arranged on a horizontal line. A pair of members 32 and 33 are arranged in the form of channels 32 and 33 are arranged with their webs 34 and 35 in spaced parallel relation and their flanges 36 and 37 projecting toward each other. The pair of members 32 and 33 are disposed in the track frame 12 and have their rear ends pivotally connected to the sides of the track frame 12 by means of a dowel pin 38 disposed in a counter-sunk opening 38a in the respective side of the track frame and in an opening 38b in the respective one of the members. A guide bar 39 is fixed to each of the flanges 36 and 37 of the pair of members 32 and 33 respectively. A front idler wheel fork 40 is disposed against the bar 27 and has integral blocks 41 and 42 at the free ends of its arms. Each of the blocks 41 and 42 has a groove 43 in its top and in its bottom. The front idler wheel fork 40 also has guides 44 and 45 projecting upwardly and downwardly from the tops and bottoms of its arms and each of the guides has a groove 46 therein. A shaft 47 is fixed in openings in the blocks 41 and 42 of the front idler wheel fork and the front idler wheel 14 is rotatably mounted on the shaft by means of roller bearings 48. The guide bars 39 are disposed in the grooves 43 in blocks 41 and 42 and in grooves 46 in guides 44 and 45 of the front idler wheel fork so that the front idler wheel fork is slidable on the guide bars. By placing a tool in a socket of worm gear 24 and turning it in one direction, worm wheel 23 is rotated causing forward movement of bar 25 which moves bar 27 forward and bar 27 in turn moves the front idler wheel fork 40 and idler wheel 14 forward causing tightening of the endless track 17. The endless track 17 is loosened by turning the worm gear 24 in the opposite direction causing rearward movement of the bar 25 and then the idler wheel 14 is pushed rearwardly resulting in loosening of the track.

Each member 32 or 33 is provided with spaced threaded holes 49, 50, 51 and a smooth hole 52 having their centers on an imaginary line 53 making an angle of approximately 1½ degrees upwardly from the longitudinal centerline 54 of the member. Each member 32 or 33 is also provided with spaced threaded holes 55, 56, 57 and a smooth hole 58 in its web making an angle of approximately 1½ degrees downwardly from the longitudinal centerline 54 of the member. Four securing elements in the form of machine screws 59, 60, 61 and a dowel pin 62 are provided for the holes in each member 32 or 33 and the holes in the side of the track frame 12. Assuming that machine screws 59, 60 and 61 and dowel pin 62 are in holes 28, 29, 30 and 31 of the track frame and in holes 55, 56, 57 and 58 in the members 32 and 33, the portion of the track 17 from the center of the idler wheel 14 to the point 63 makes an angle a with the ground. Under normal operation of the tractor the angle a is desirable to minimize pounding of the track grousers against the idler wheel 14 as it engages hard ground during dozer or scraper operations. That is, when a bulldozer is attached to the front of the tractor or a scraper is pulled by the tractor. The angle a is undesirable when the tractor handles a load at its front end, that is, when a bucket is mounted on the front end of the tractor. For this condition the angle a should be zero. If the angle a is not zero the load will cause the front end of the tractor to swing downwardly resulting in bouncing of the tractor operator and rendering him uncomfortable. To move the idler wheel 14 vertically downwardly, the machine screws 59, 60 and 61 and dowel pin 62 are removed from holes 28, 29, 30 and 31 in the track frame and holes 55, 56, 57 and 58 in the members 32 and 33 and the members are allowed to swing downwardly about the pivot pins 38 until the holes 49, 50, 51 and 52 in the members 32 and 33 are in alignment with the holes 28, 29, 30 and 31 in the track frame 12. The members 32 and 33 will pivot downwardly due to their own weight and due to the weight of the front idler fork 40 and the idler wheel 14. The machine screws 59, 60 and 61 and dowel pin 62 are then inserted in the holes 28, 29, 30 and 31 in the track frame 12 and in the holes 49, 50, 51 and 52 in the members 32 and 33 and the nuts threaded on the bolts. The angle a will now be zero. To move the idler wheel 14 vertically upwardly machine screws 59, 60 and 61 and dowel pin 62 are removed from holes 49, 50, 51 and 52 in the members 32 and 33 and holes 28, 29, 30 and 31 in the track frame 12 and a pry bar is placed under the track 17 below the idler wheel 14 to raise the idler wheel until the holes 55, 56, 57 and 58 in the members are opposite the holes 28, 29, 30 and 31 in the track frame 12 and then the machine screws 59, 60 and 61 and dowel pin 62 are placed in these opposing holes in the members and track frame. The portion of the track 17 between the front idler wheel 14 and the point 63 will now make the angle a with respect to the ground. The dowel pin 62 fits tightly in the hole 31 in the track frame and in the holes 52 and 58 in the members 32 and 33 and carry a portion of the loads to which the idler wheel 14 is subjected while the machine screws 59, 60 and 61 fit loosely in their holes 28, 29 and 30 in the track frame and in the holes 49, 50 and 51 or 55, 56 and 57 in the members and do not carry any portion of the loads to which the idler wheel is subjected but merely serve to clamp the members to the track frame. The machine screws 59, 60 and 61 are all substantially similar as illustrated by the machine screw 61 in Figure 8. The dowel pins 38 and 62 are substantially similar as illustrated by the dowel pin 62 in Figure 7. Thus it will be seen that applicant's arrangement provides an easy and fast means of vertically adjusting the front idler wheel of a crawler tractor and applicant's vertically adjusting means is easier and faster to adjust than the vertically adjusting means used in the past.

The angle a should be zero for finished grading of a road surface. If the angle a is greater than zero then upon exceeding a certain load on the grader, the pivoting point of the tractor will shift from point 63 to a point below the front idler wheel of the tractor and the grader blade will dig into the ground which is not desirable for finished grading. Upon swinging the grader blade out of the ground part of the load on the grader blade is lost and the tractor pivots about point 63 and loses the rest of the load by the grader blade being for example six inches above the ground. Then the tractor operator has to lower the grader blade to ground level and the cycle will be repeated. The tractor operator will actually operate below a certain weight of earth on the grader blade to prevent shifting of the tractor pivoting point from point 63 to a point below the front idler wheel where the grader blade has a full capacity of approximately twice that weight of earth. Where the angle a is zero the tractor tends to pivot only about a point below the front idler wheel and the grader blade can carry the weight of earth corresponding to its full capacity without any actual pivoting of the tractor about said point.

What is claimed is:

1. In a crawler vehicle, a pair of track frames disposed at the sides of the vehicle and each being provided with a hole therein, a pair of wheels disposed on each side of the vehicle, an endless track trained over each pair of wheels, and means for vertically adjusting one of the wheels on each side of the vehicle comprising a member provided with a first hole and a second hole spaced transversely thereof from the first hole and one end of the member being pivotally connected to the respective one of the track frames, said one of the wheels being carried by the respective member intermediate the ends thereof, and securing elements for the holes in the members and track frames, each of the securing elements being disposed in the first hole in the respective member and the hole in the respective track frame to hold said one wheel at one elevation and being disposed in the second hole in the member and the hole in the track frame to hold said one wheel at another elevation.

2. In a crawler vehicle, a pair of hollow track frames disposed at the sides of the vehicle and each side of each track frame being provided with a hole therein, a pair of wheels disposed on each side of the vehicle, an endless track trained over each pair of wheels, and means for vertically adjusting one of the wheels on each side of the vehicle comprising a pair of members arranged in spaced parallel relation and each being provided with a first hole and a second hole spaced transversely of the respective member from the first hole and the pair of members being disposed in the respective one of the track frames and having one end pivotally caried thereby, said one of the wheels being carried by the respective pair of members intermediate the ends thereof, and securing elements for the holes in the members and track frames, the securing elements being disposed in the first holes in the respective pair of members and the holes in the respective track frame to hold said one wheel at one elevation and being disposed in the second holes in the pair of members and the holes in the track frame to hold said one wheel at another elevation.

3. In a crawler vehicle, a pair of hollow track frames disposed at the sides of the vehicle and each side of each track frame being provided with a plurality of spaced holes arranged on a line, a pair of wheels disposed on each side of the vehicle, an endless track trained over each pair of wheels, and means for vertically adjusting one of the wheels comprisng a pair of members arranged in spaced parallel relation and each being provided with a first set of spaced holes arranged on a line and a second set of spaced holes arranged on a line making an angle with the first set of holes and the pair of members being disposed in the respective one of the track frames and having one end pivotally carried thereby, said one of the wheels being carried by the respective pair of members intermediate the ends thereof, and securing elements for the holes in the members and track frames, the securing elements being disposed in the first set of holes in the respective pair of members and the holes in the respective track frame to hold said one wheel at one elevation and being disposed in the second set of holes in the pair of members and the holes in the track frame to hold said one wheel at another elevation.

4. In a crawler vehicle, a pair of track frames disposed at the sides of the vehicle and each side of each track frame being provided with a plurality of spaced holes disposed on a horizontal line, a pair of wheels disposed on each side of the vehicle, an endless track trained over each pair of wheels, and means for vertically adjusting one of the wheels comprising a pair of channels arranged with their webs in spaced parallel relation and their flanges projecting toward each other and the web of each of the channels being provided with a first set of spaced holes arranged on a line making an angle in one direction from the longitudinal centerline of the respective channel and a second set of spaced holes arranged on a line making an angle from the longitudinal centerline of the channel in a direction opposite from the direction of measurement of the first named angle from the longitudinal centerline of the channel and the pair of channels being disposed in the respective one of the track frames and having one end pivotally carried thereby, said one of the wheels being carried by the respective pair of channels intermediate the ends thereof, and securing elements for the holes in the channels and track frames, the securing elements being disposed in the first set of holes in the respective pair of channels and the holes in the respective track frame to hold said one wheel at one elevation and being disposed in the second set of holes in the pair of channels and the holes in the track frame to hold said one wheel at another elevation.

References Cited in the file of this patent

UNITED STATES PATENTS

| 2,091,464 | Baker et al. | Aug. 31, 1937 |
| 2,466,029 | Knox et al. | Apr. 5, 1949 |
| 2,774,638 | Spanger | Dec. 18, 1956 |

FOREIGN PATENTS

| 40,225 | Denmark | June 3, 1929 |
| 42,503 | Denmark | June 20, 1930 |